(12) United States Patent
Storck et al.

(10) Patent No.: US 6,529,794 B1
(45) Date of Patent: Mar. 4, 2003

(54) METHOD AND DEVICE FOR MEASURING DISTANCE AND SPEED

(75) Inventors: Eckhard Storck, München (DE); Martin Vossiek, München (DE); Patric Heide, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/463,052
(22) PCT Filed: Jul. 27, 1998
(86) PCT No.: PCT/DE98/02114
§ 371 (c)(1), (2), (4) Date: Jan. 18, 2000
(87) PCT Pub. No.: WO99/10757
PCT Pub. Date: Mar. 4, 1999

(30) Foreign Application Priority Data

Aug. 22, 1997 (DE) .......................... 197 36 693

(51) Int. Cl.$^7$ .............................................. G06F 19/00
(52) U.S. Cl. .......................... 700/177; 700/39; 702/194
(58) Field of Search ................................. 700/171, 173, 700/177, 160, 175, 39, 40; 702/76, 142, 196, 194

(56) References Cited

U.S. PATENT DOCUMENTS

| 5,560,367 | A | | 10/1996 | Haardt et al. ................ 600/515 |
| 5,895,444 | A | * | 4/1999 | Ruck et al. .................. 700/168 |
| 5,917,726 | A | * | 6/1999 | Pryor .......................... 700/95 |
| 5,959,568 | A | * | 9/1999 | Woolley ....................... 700/255 |

FOREIGN PATENT DOCUMENTS

| EP | 0 848 829 | 9/1996 |
| WO | WO 97/09637 | 3/1997 |

OTHER PUBLICATIONS

D. Rao Bhaskar et al., "Model Based Processing of Signals: A State Space Approach", Proc. Of the IEEE, vol. 80, No. 2, Jan. 02, 1992, pp. 283–309, XP000291184.
A.G. Stove, "Linear FMCW Radar Techniques", IEEE Proc. 1992, vol. 139, No. 5, pp. 343–350.
H.D. Griffiths, "The Effect Of Phase and Amplitude Errors In FM Radar", IEEE Colloqium on High Time–Bandwidth Product Waveforms in Radar and Sonar, London, UK, May 1, 1991, pp. 9/1–9/5.
L.G. Cuthbert et al., "Signal Processing In An FMCW Radar For Detecting Voids and Hidden Objects in Building Materials" in I.T. Young et al. (Eds.): "Signal Processing III: Theories and Applications", Elsevier Science Publishers B.V., Eurasip 1986.
D. W. Tufts et al, "Estimation of Frequencies of Multiple Sinusoids: Making Linear Prediction Perform Like Maximum Likelihood", Proc. IEEE, vol. 70, 1982, pp. 975–989.
S. L. Marple, Jr., "Digital Spectral Analysis With Applications", Prentice Hall, Englewood Cliffs, NJ. 1988.
S.M. Kay, "Modern Spectral Estimation, Theory and Application", Prentice Hall, Englewood Cliffs, NJ, 1988.

\* cited by examiner

Primary Examiner—Maria N. Von Buhr
Assistant Examiner—Kidest Bahta
(74) Attorney, Agent, or Firm—Schiff Hardin & Waite

(57) ABSTRACT

Signals are emitted with a FMCW sensor system, are received after reflection at targets and are processed to form a measured signal whose frequency spectrum is analyzed. Discrete, equidistant samples are stored and are arranged in a double Hankel matrix in the existing sequence. This matrix is diagonalized with a singular value decomposition, and an approximation is identified taking only the "principle values" into consideration, in order to calculate the frequencies and their amplitudes therefrom according to known methods.

6 Claims, 2 Drawing Sheets

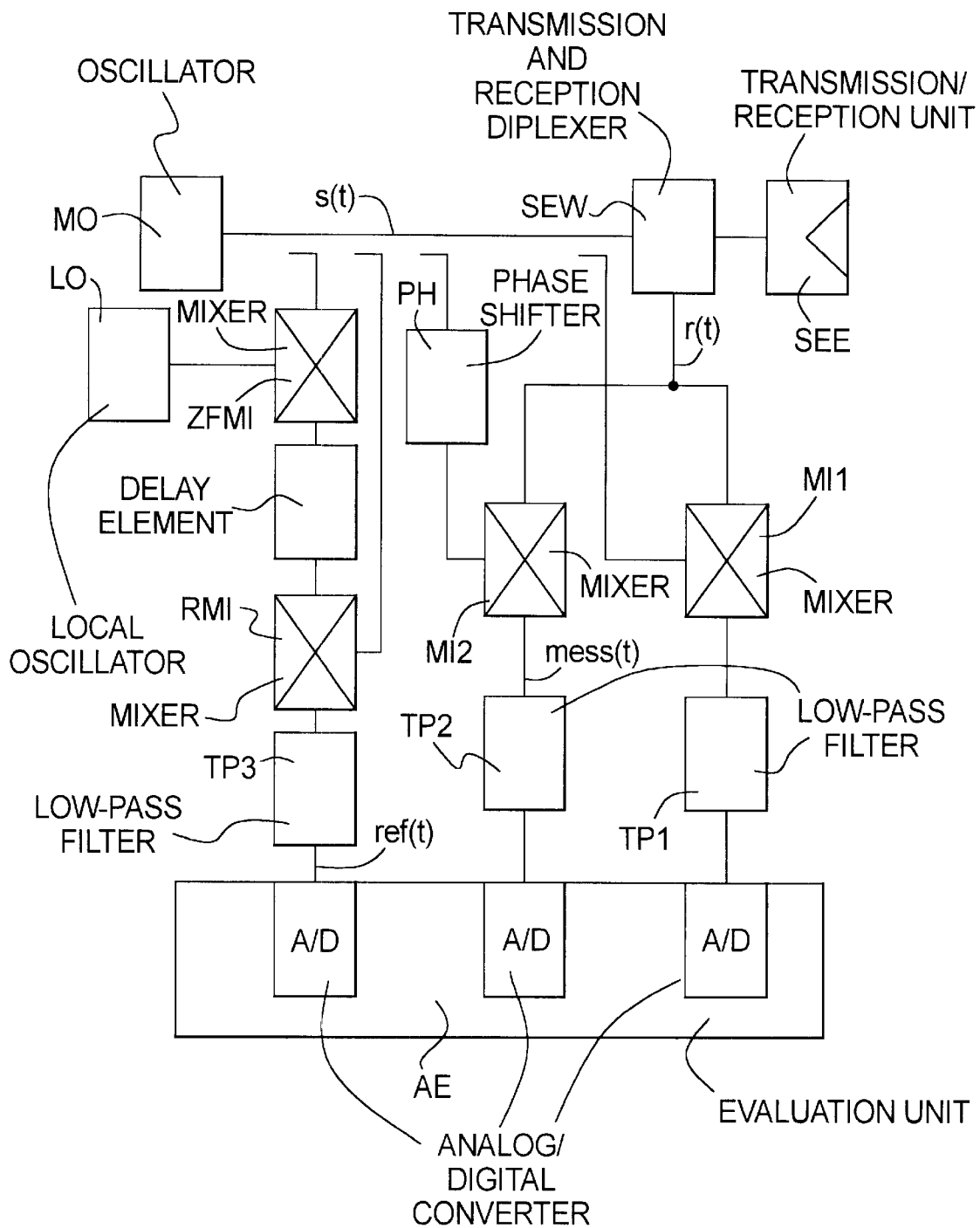

METHOD AND DEVICE FOR MEASURING DISTANCE AND SPEED

BACKGROUND OF THE INVENTION

One job of sensor technology is the contact-free, precise measurement of distances and speeds. Microwaves, light waves or ultrasound are utilized for this purpose. Such sensors are versatilely employed, for example in industrial automation, in automotive technology and in the household. Radar sensors according to the FMCW principle (frequency modulated continuous wave) are standard.

FIG. 1 shows a typical circuit diagram of a FMCW sensor (also see A. G. Stove, "Linear FMCW Radar Techniques.", IEE Proc. F 139, 343–350 (1992)). The signal source is an oscillator no that can be frequency-modulated. This oscillator is detuned time-dependently in frequency via a drive unit. The sensor emits the transmission signal s(t) via the transmission/reception unit SEE, and receives a reception signal r(t) delayed in time corresponding to the running time to the target. A separation of transmission and reception signals is effected, for example, by a transmission and reception diplexer SEW; for instance, (a circulator or a directional coupler. Alternatively, separate antennas can be employed for transmission and reception (what is referred to as a bistatic arrangement). The measured signal mess(t) generated in a first mixer MI1, which corresponds to the mixed product (difference frequency) of transmission signal s(t) and reception signal r(t), is filtered with a low-pass filter TP1. For generating a measured signal that allows a presentation as a complex number, the reception signal r(t) can be mixed in a second mixer MI2 with the transmission signal shifted in phase by $\pi/2$ in a phase shifter PH and can be subsequently filtered in a second low-pass filter TP2. The evaluation in an evaluation unit AE is preferably constructed with a digital signal processor to which the measured signal digitalized with analog-to-digital converters A/D is supplied as real part cosine and imaginary part sine of the complex signal. The frequency modulation of the transmission signal usually occurs linearly in time (see H. D. Griffiths, "The Effect of Phase and Amplitude Errors in FM Radar", IEEE Colloquium on High Time-Bandwidth Product Waveforms in Radar and Sonar, London, UK, May 1, 1991, pages 9/1–9/5).

DE 195 33 124 discloses a method wherein errors in the frequency modulation are detected and corrected upon employment of a delay line. Such a delay line is shown in drawing FIG. 1, this comprising a delay element T (preferably a surface wave component) and a further mixer RMI. Preferably, a further low-pass filter TP3 follows. In the further mixer RMI, the delayed signal is mixed with the current signal to form a reference signal. A correction signal is calculated in the evaluation unit AE, this correction signal then also potentially serving the purpose of undertaking a correction of the frequency modulation via a programmable drive unit. The drawing FIG. 1 shows a sensor system wherein the transmission frequency before the delay is mixed onto a lower intermediate frequency in a mixer ZFMI. The local oscillator LO is provided for this purpose, this supplying a lower frequency than the signal source MO.

In any case, the sensor signal mess(t) of a FMCW radar sensor is composed of a superimposition of discrete sine oscillations whose frequencies represent the quantities to be measured (distance, running time, velocity). Given, for example, a filling level sensor, the frequency of the sensor signal is proportional to the difference between container height and filling height; given the presence of a plurality of targets, correspondingly more frequencies occur. When a target moves, than the distance-dependent frequency of the sensor signal has an additional Doppler frequency additively superimposed on it. In the specific case of a CW radar sensor, only this Doppler frequency is detected, this representing the target velocity.

A Fourier transformation is usually employed for interpreting the frequency spectrum of measured signals. In this "Fourier analysis", the resolution with which neighboring frequencies can be separated is limited due to various influences. Given FMCW sensors, the limiting resolution also derives from the bandwidth of the frequency modulation limited by the technology or by approval stipulations. On the other hand, an optimally high frequency resolution is desirable so that noise frequencies can be separated from the signal frequencies in as far-reaching way as possible.

The application of auto-regressive methods (AR; specific parametric modeling methods) has been discussed in the literature for enhancing the frequency resolution of FMCW sensors (L. G. Cuthbert et al, "Signal Processing In An FMCW Radar For Detecting Voids and Hidden Objects In Building Materials", in I. T. Young et al (editors), Signal Processing III: Theories and Applications, Elsevier Science Publishers B. V., EURASIP 1986). In fact, a higher frequency resolution can be achieved with modern parametric modeling methods (AR, MA and ARMA; S. M. Kay, "Modem Spectral Estimation, Theory and Application", Prentice Hall, Englewood cliffs, N.J., 1988) than with Fourier analysis, but only with an adequately great signal-to-noise ratio of the measured signal, which must amount to more than 40 dB given a typical data length of N=100. This prerequisite, however, is generally not met in a FMCW sensor.

Methods for analysis of frequency spectra wherein mathematical investigations deriving from Prony are combined with what is referred to as a singular value decomposition (referred to below as SVD) are described in the text book by S. L. Marple, Jr., "Digital Spectral Analysis With Applications", Prentice Hall, Englewood Cliffs, N.J., 1988. These methods are always especially successful when the signal x(n) is composed of a finite number p of discrete frequencies $f_k$ (with the amplitudes $c_k$) and noise R(n) according to $$x(n) = \sum_{k=1}^{p} c_k e^{2\pi i f_k n} + R(n), \quad n = 1, 2, 3, \ldots, N, \tag{1}$$

This is the case in FMCW sensors, particularly in combination with the above-described distortion-correction with a surface wave delay line.

The frequencies $f_k$ and their plurality p as well as the corresponding (complex) amplitudes $c_k$ are to be determined from the finite data set [x(1), x(2), . . . , x(N)]. In the underlying Prony method (without SVD), what are referred to as the FBLP coefficients (forward backward linear prediction) a (k) (k=0, . . . , p) are calculated from x(n) in a first step. These satisfy the equations $$(0)x(n)+a(1)x(n-1)+ \ldots +a(p)x(n-p)=0 \tag{2}$$

and, with the complex, conjugated data x*(n) in reverse sequence $$a(0)x^*(n-p)+a(1)x^*(n-p+1)+ \ldots +a(p)x^*(n)=0 \tag{2b}$$

for n=p+1, p+2, . . . , N.

A total of N-p of such linear equation pairs (2a, 2b) can be erected with the given data set [x(1),x(2), . . . , x(N)], i.e. 2(N-p) equations; the a(k) can be determined therefrom. In general (when N>2p applies), the equation system (2a, 2b) is composed of more equations than of unknowns a(k). The method according to the principle of the least square (referred to below as LS) is then utilized for a solution, and, as a result thereof, averaged via noise influences due to the noise components R(n) from equation (1): for an over-defined, linear equation system A · x=b, the LS solution is generally established by $$x = (A^H \cdot A)^{-1} \cdot A^H \cdot b$$

(see, for example, the textbook of Marple, Page 77).

The sought signal frequencies $f_k$ are then calculated in a second step from the zero settings $z_k$ of the polynomial P9z) formed with the a(k) according to $$P(z) = \sum_{k=0}^{p} a(k) z^{p-k} \quad (3)$$

When, for instance, $z_k$ is one of the p zero settings, i.e. $P(Z_k)=0$ applies, then $$\exp(2\pi \cdot i \cdot f_k) = z_k. \quad (4)$$

When the frequencies are identified, then the equations $$x(n) = \sum_{k=1}^{p} c_k e^{2\pi i f_k^n}, \quad n = 1, 2, 3, \ldots, N, \quad (5)$$

generally form an over-defined, linear equation system for the p amplitudes $c_k$ that is solved in a third step by LS methods (see above), as a result whereof averaging is again carried out over noise influences by the R(n) components.

The results that can be achieved with this method are more beneficial than with Fourier analysis only given a high signal-to-noise ratio of the measured signal. Moreover, the model parameter p is generally not known and the identification thereof is problematical. Improvements are achieved by application of SVD (D. W. Tufts, R. Kumaresan, "Estimation of Frequencies of Multiple Sinusoids: Making Linear Prediction Perform Like Maximum Likelihood", Proc. IEEE 70, 979–989 (1982)).

Far more FBLP coefficients a(k) are introduced than the plurality p of anticipated frequencies, for instance L(>p). The equations analogous to (2a) and (2b) then read $$a(0)x(n)+a(1)x(n-1)+ \ldots +a(L)x(n-L)=0, \quad (6a)$$

$$a(0)x^*(n-L+a(1)x^*(n-L+1)+ \ldots +a(L)x^*(n)=0, \quad (6b)$$

for n=L+1, L+2, ..., N with p<L<N−p.

These N−L pairs of equations can be combined to $$[a(L), a(L-1), \ldots, a(0)] \cdot D_{NL} = 0 \quad (7)$$

(· references the matrix multiplication) with $$D_{NL} = \begin{bmatrix} x(1) & x(2) & \ldots & x(N-L) & x*(N) & x*(N-1) & \ldots & x*(L+1) \\ x(2) & x(3) & \ldots & x(N-L+1) & x*(N-1) & x*(N-2) & \ldots & x*(L) \\ \vdots & \vdots & \vdots & \vdots & \vdots & \vdots & \vdots & \vdots \\ x(L+1) & x(L+2) & \ldots & x(N) & x*(N-L) & x*(N-L-1) & \ldots & x*(1) \end{bmatrix}$$

Here, the measured data are arranged in a matrix, what is referred to as a double Hankel matrix. Each column of this matrix, multiplied by the line vector [a(l), a(L−1), ..., a(0)], supplies one of the equations (6a, 6b). If the signal x(n) were to contain no noise, i.e. only p exponential oscillations, then the equation system for determining the L coefficients a(k) would be over-defined, i.e. only p of the equations (6a) and (6b) would be linearly independent. Accordingly, the matrix $D_{NL}$ would have the rank p(<L). When, however, noise is present, then $D_{NL}$ generally has the maximum rank (2N−2L or L+1) and only approximately has the lower rank p.

With the assistance of what is referred to as a "singular value decomposition"(SVD), a matrix is defined from $D_{NL}$ that has the rank p and is an approximation of $D_{NL}$ in the sense of the LS method (least sum of the square of the deviations) known from the literature. According to $$D_{NL} = U \cdot S \cdot V^H \quad (8)$$

the SVD resolves the matrix $D_{NL}$ into two unitary matrices U and V ($V^H$ is the adjoint matrix for V) as well as a matrix S that is a quadratic and a positively defined diagonal matrix or contains a quadratic and positively defined diagonal matrix as a sub-matrix and, moreover, has only zeroes as elements. The diagonal elements $S_{kk}$ (what are referred to as the singular values of $D_{NL}$ of this "diagonal matrix" S are arranged according to size in conformity with $S_{11} \geq S_{22} \geq \ldots \geq S_{LL} \geq 0$.

The number of diagonal elements different from 0 is equal to the rank of $D_{NL}$. If the signal x(n) were to contain no noise, i.e. only p exponential oscillations, then exactly p(<L) diagonal elements, what are referred to as the "principal components" (PC) would differ from 0; the others would be equal to 0. When, however, noise is present, then the remaining diagonal elements are in fact generally ≠0 but are small compared to the principal components. They are set approximately equal to 0 (PC method). An approximation S_ of S is thus obtained.

With this approximation S_instead of S in the SVD decomposition (8), one then obtains, according to $$D\_{NL} = U \cdot S\_ \cdot V^H \quad (9)$$

a p-rank approximation $D\_{NL}$ for the matrix $D_{NL}$. With $D_{NL}$ instead of $D_{NL}$, the FBLP coefficients a(k) are then calculated from the equation system $$[a(L), a(L-1), \ldots, a(0)] \cdot D\_{NL} = 0 \quad (7a)$$

and, thus, the above-described steps 2 and 3 (Prony) are implemented.

Since the rank of $D\_{NL}$ is equal to p(<L), the equation system (7a) is under-defined, i.e. its solution is initially not unambiguous. However, the solution with the least $$\text{Norma}(a(k)) = \sqrt{\sum_{k=0}^{L} |a(k)|^2}$$

is unambiguous given the subsidiary condition a(0)=1, and this minimum norm solution is generally established for an under-defined, linear equation system A·x=b by $$x = A^H \cdot (A \cdot A^H)^{-1} \cdot b$$

see, for example, the textbook of Marple, page 77. It has been empirically found that this minimum norm solution of the equation system (7a) in the second step leads to extremely good results for the sought frequencies.

Instead of being implemented with the date of matrix $D_{NL}$, these calculations can also be implemented with the covariance matrix $D_{NL}$, $D_{NL}{}^H$.

An advantageous version of the described PC method derives in the "state space"presentation (B. D. Rao, K. S. Arun, "Model Based Processing Of Signals: A State Space Approach", Proc. IEEE 80, 283–309 (1992)). The point of departure is the p-rank approximation $D\_\_{NL}$ from (9), namely $$D\_\_{NL} = U_* S\_\_ . V^H \quad (9a)$$

It can be shown that the product of the two first factors $U_* S\_\_$ can be factorized according to $$U_* * S\_\_ = \begin{bmatrix} h \\ hF \\ hF^2 \\ \vdots \\ hF^L \end{bmatrix},$$

whereby h is a line vector having the length p, and F is the "state transition matrix" with p rows and p columns. The eigenvalues and eigenvectors of F supply the signal frequencies $f_k$ and the appertaining amplitudes $c_k$ without having to calculate the FBLP coefficients a(k).

One can proceed in the following way for calculating F: in the matrix, $U_* S\_\_$ with L+1 rows and p columns, the last row is omitted once (the result would read G1) and the first row (G2) is omitted on another occasion. $G1_* F = G2$ then applies. Due to L>p, this equation system is over-defined for F and has the LS solution $$F(G1^H.G1)^{-1}.G1^H.G2$$

The matrix $\Lambda = Q^{-1}{}_*F_*Q$, formed with a matrix Q in whose columns the eigenvectors of F reside, is a diagonal matrix having the diagonal elements $\Lambda_{kk} = \exp(2\pi \cdot i \cdot f_k)$. The $f_k$ are the desired frequencies. For defining the amplitudes $c_k$, $A=U_* S\_\_{}_* Q$ and $B = Q^{-1}{}_* V^H$ are formed. The amplitudes $c_k$ then derives for each k by multiplication of the element of the first row of A residing in the $k^{th}$ column by the element of the first column of B residing in the $k^{th}$ row and division by the corresponding eigenvalue of F according to $$c_k = A_{1k} \cdot B_{k1} / \exp(2\pi \cdot i \cdot f_k)$$

An object of the present invention is to specify an improved method with which the distances and/or velocities of a plurality of objects can be simultaneously exactly measured.

According to the present invention, a method and apparatus is provided for distance and speed measurement. Signals that propagate in a waveform are emitted and, after reflection at targets, are registered as measuring signals so that the measured signals comprise a frequency modulation that is dependent on a value or values of a quantity or quantities to be measured. A frequency spectrum of the measured signals is analyzed on the basis of a previously defined plurality of measured values. The analyzing occurs by acquiring the plurality of measured values by sampling the measured signal at equidistant time intervals and storing the measured values in a predetermined sequence. Except for equivalent conversions, a data matrix wherein the measured values are chronologically arranged as a double Hankel matrix is diagonalized according to a SVD method. An approximation of the diagonalized data matrix is determined in that diagonal elements are set equal to zero beginning from a predetermined limit or from a limit calculated from a distribution of the diagonal elements. Frequencies are calculated from remaining diagonal elements.

BRIEF DESCRIPTION OF THE DRAWINGS

FIG. 1 is a block diagram of a prior art FMCW sensor system;

DESCRIPTION OF THE PREFERRED EMBODIMENTS

Figure 2:
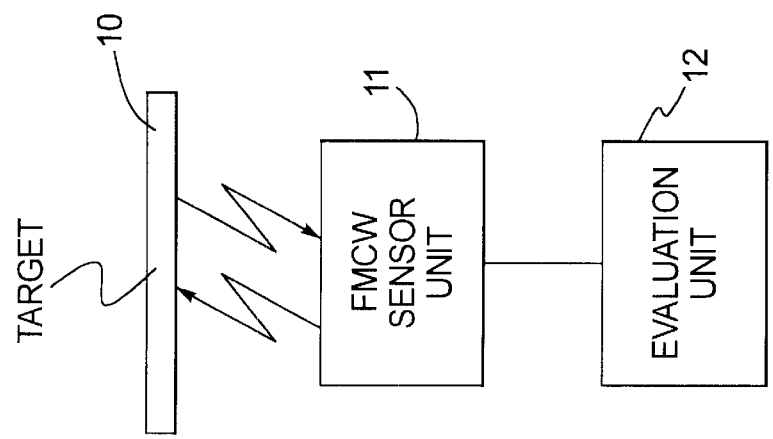
FIG. 2 is a block diagram of the FMCW sensor unit and evaluation unit of the invention employing the inventive method steps shown in FIG. 3.

In the inventive method, a measured signal that has a superimposition of various frequencies is acquired with a sensor that emits signals that propagate in a waveform and receives them after reflection at targets 10 and edits them to form measured signals, preferably with a FMCW sensor unit 17, and the evaluation of this measured signal is implemented with the assistance of a high-resolution frequency analysis in the evaluation unit (12 (See FIG. 2) Discretely sampled values of the measured signal acquired at equidistant time intervals from one another are arranged as a data matrix in the form of a double Hankel matrix and a SVD (singular value decomposition) as initially described is implemented. Estimated values for the signal frequencies and the corresponding amplitudes are then calculated from the PC (principal components) of the obtained diagonal matrix S and for the corresponding sub-matrices of the unitary transformation matrices U and, potentially, V.

The method can preferably be employed in a sensor system that is fundamentally constructed as initially set forth. Instead of a mixer, some other suitable structure for editing a measured signal can be provided. What are referred to as IQ mixers can be utilized for generating a complex-value measured signal. However, real measured values for which the conjugated complex value is equal to the original value suffice for the inventive method. The measured signal mess(t) is preferably largely freed of errors of the frequency modulation occurring in the arrangement, this potentially occurring, for example, with a delay line for generating a reference signal. So that the frequency analysis utilized in the inventive method supplies good measured results, the frequencies occurring in the measured signal must be kept constant in time insofar as possible. When a systematic frequency drift occurs, the variation of the frequency can be compensated, for example, in that the measured values are sampled at continuously varying time intervals. A sensor system having a technical design that supplies a measured signal from the very outset having constant frequencies—leaving noise out of consideration—is advantageous. Measured values are stored in the evaluation unit 12 and calculations for frequency analysis are implemented therewith. This preferably occurs in a digital signal processor with the values previously digitalized with an analog-to-digital converter.

The method for frequency analysis described in the introduction is utilized in the inventive evaluation method and supplies especially good results when the conditions explained are adhered to. The indicated, fundamental mathematical conversions and derivations can be replaced by equivalent conversions and simplifications in the computational execution that can thus be achieved. N measured values $$x(n) = \sum_{k=1}^{p} c_k e^{2\pi i f_k^n} + R(n), \quad n = 1, 2, 3, \ldots, N,$$

that are respectively assumed as a superimposition of p signal parts presentable as complex exponential functions are utilized for the evaluation. The various frequencies $f_k$ result, for example, from the reflection by different targets at different distances and from the Doppler shift of the transmission frequencies due to moving targets. Using the measured values $x(n)$ that are stored in the evaluation unit 12, the FBLP coefficients (forward/backward linear prediction) $a(k)$ (k=0, ..., L) are calculated in a first step, these satisfying the equations $a(0)x(n)+a(1)x(n-1)+ \ldots +a(L)x(n-L)=0$ and $a(0)x^*(n-L)+a(1)x^*(n-L+1)+ \ldots +a(L)x^*(n)=0$ for n=L+1, L+2, ..., N with p<L<N-p.

The coefficient matrix (data matrix) of the $a(k)$ to be identified, $$D_{NL} = \begin{bmatrix} x(1) & x(2) & \ldots & x(N-L) & x*(N) & x*(N-1) & \ldots & x*(L+1) \\ x(2) & x(3) & \ldots & x(N-L+1) & x*(N-1) & x*(N-2) & \ldots & x*(L) \\ \vdots & \vdots & \vdots & \vdots & \vdots & \vdots & \vdots & \vdots \\ x(L+1) & x(L+2) & \ldots & x(N) & x*(N-L) & x*(N-L-1) & \ldots & x*(1) \end{bmatrix}$$

is resolved into $U_* S_* V^H$ as described in the introduction with two unitary matrices U and V as well as a "diagonal matrix" S (that is quadratic only in specific instances) with non-negative diagonal elements, $D_{\_NL}=U_* S_* V^H$ with the approximation $S_\_$, wherein the small diagonal elements of S are set equal to 0, is determined. The FBLP coefficients $a(k)$ are calculated from the equation system $[a(L), a(L-1), \ldots, a(0)]_* D_{\_NL}=0$ with this matrix $D_{\_NL}$ as a minimum norm solution.

What is advantageous in the determination of $D_{\_NL}$ is that the plurality p of frequencies is likewise identified, so that conclusions can be drawn about the plurality of measured quantities that, for example, is established by the initially unknown number of existing targets. The condition according to which p is defined can be adapted to the quantities to be measured or to accompanying circumstances of the measurement. One criterion for the definition, which sets the diagonal elements of S equal to zero, is, for example, the difference of successive values of the diagonal elements. When, for example, this difference becomes less then 2 dB and remains this low, the diagonal elements that differ from one another only by less than 2 dB are set equal to zero.

In a second step, the sought signal frequencies $f_k$ are then calculated from the zero settings $z_k$ of the polynomial $P(z)$ formed with the $a(k)$ according to $$P(z) = \sum_{m=0}^{L} a(m) z^{L-m}.$$

When $P(z_k)=0$, then $\exp(\pi \cdot i \cdot f_k)=z_k$ applies. The quantities $c_k$ are determined in a third step, for example by LS (least squares) methods.

The clearly best results are achieved given this method when a value between $\frac{1}{2} \cdot N$ and $\frac{2}{3} \cdot N$ is selected for L. In practical instances, L can deviate from this value; $L=\frac{1}{3} \cdot N$ suffices, even $L=\frac{1}{4} \cdot N$ in some cases.

An advantageous version of the method derives in state space presentation. The starting point is the p-rank approximation $D_{\_NL}=U_* S_{\_*} V^H$. The matrix G1, which arises from the matrix $U_* S_\_$ by omission of the last row, and the matrix G2, which arises from the matrix $U_* S_\_$ by omission of the first row, are calculated. The state transition matrix F having p rows and p columns is calculated according to $F=(G1^H_* G1)^{-1}_* G1^H_* G2$. The eigenvalues $\exp(2\pi \cdot i \cdot f_k)$ of f yield the frequencies. For determination of the amplitudes $c_k$, the matrix Q in whose columns the eigenvectors of F reside and the first row of $A=U_* S_{\_*} Q$ and the first column of $B=Q^{-1}_* V^H$ are calculated. $c_k$ is then calculated according to $c_k=A_{1k} \cdot B_{k1}/\exp(2 \cdot 2\pi \cdot i \cdot f_k)$.

Figure 3:
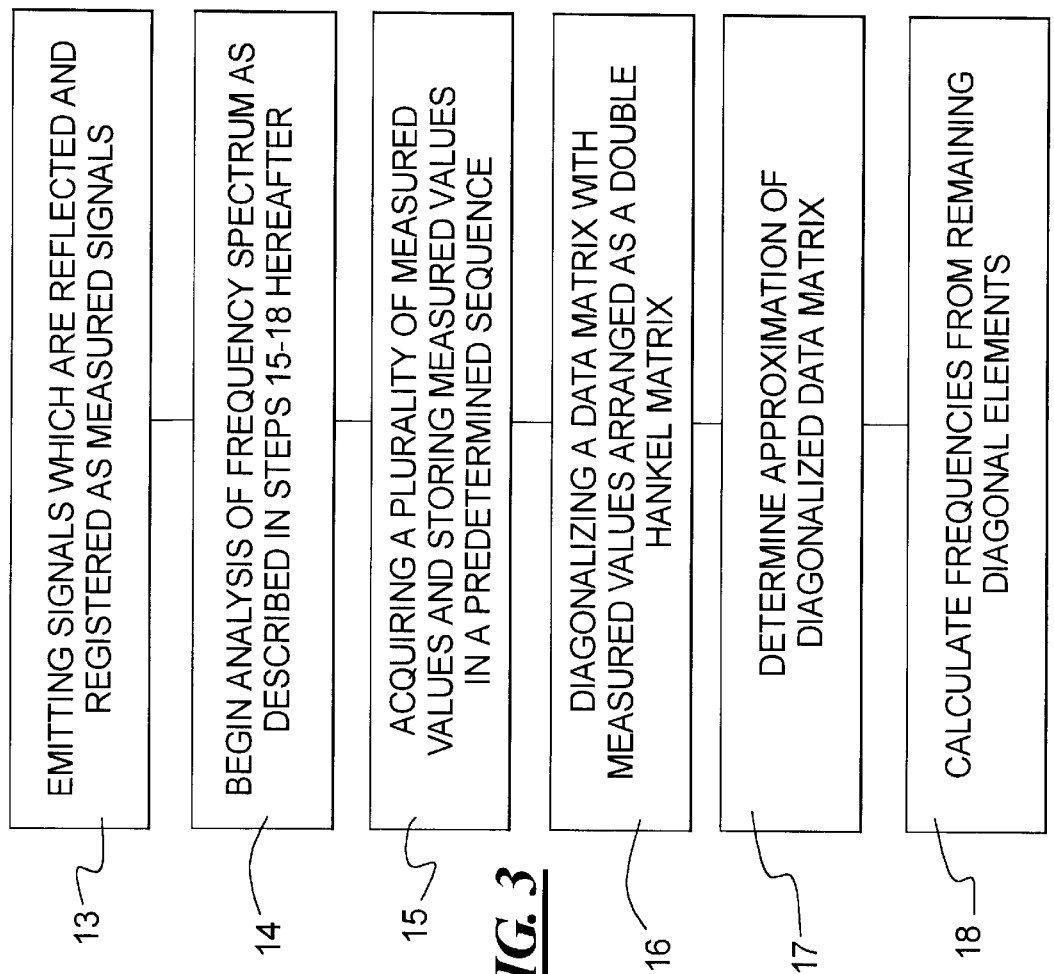
FIG. 3 is a diagram-flow chart showing method steps of the invention.

The method steps of the invention are set forth in the flow chart in FIG. 3 for measuring distance and speed. In the first step (block 13), signals that propagate in a waveform are emitted and, after reflection at targets, are registered as measured signals. In the second step (block 14), analysis of the frequency spectrum begins and is conducted in accordance with steps 3–6 as described hereafter and as shown in blocks 15 through 18. In block 15, the plurality of measured values are acquired by sampling the measured signal at equidistant time intervals and by storing the measured values in a predetermined sequence. In block 16, except for equivalent conversion, a data matrix wherein the measured values are chronologically arranged as a double Hankel matrix is diagonalized according to a SVD method. In block 17, an approximation of the diagonalized data matrix is determined in that diagonal elements are set equal to zero beginning from a predetermined limit or from a limit calculated from a distribution of the diagonal elements. In the final step (block 18), frequencies are calculated from remaining diagonal elements (principle components).

Although various minor changes and modifications might be proposed by those skilled in the art, it will be understood that our wish is to include within the claims of the patent warranted hereon all such changes and modifications as reasonably come within our contribution to the art.

We claim:

1. A method for distance and speed measurement, comprising the steps of:

emitting signals that propagate in wave form and, after reflection at targets, registering the emitted signals as measured signals, so that said measured signals comprise a frequency modulation that is dependent on a value or values of a quantity or quantities to be measured;

analyzing a frequency spectrum of the measured signals on the basis of a previously defined plurality of measured values; and the analyzing occurring by the steps of acquiring said plurality of measured values by sampling the measured signal at equidistant time intervals and storing the measured values in a predetermined sequence, except for equivalent conversions, diagonalizing a data matrix wherein the measured values are chronologically arranged as a double Hankel matrix according to a SVD method, determining an approximization of the diagonalized data matrix in that diagonal elements are set equal to zero beginning from a predetermined limit or from a limit calculated from a distribution of the diagonal elements, and calculating frequencies from remaining diagonal elements.

2. The method according to claim 1 wherein in a further step FBLP coefficients a(n) are calculated as a minimum norm solution, and frequencies $f_k$ are calculated from zero settings $z_k = \exp(2\pi \cdot i \cdot f_k)$ of a polynomial $$\sum_{m=0}^{L} a(m) z^{L-m}.$$

3. The method according to claim 1 wherein in a further step, a state transition matrix is calculated for said approximation determination, and frequencies are calculated from eigenvalues $\Lambda_{kk} = \exp(2\pi \cdot i \cdot f_k)$ of a state transition matrix.

4. An apparatus for distance and speed measurement, comprising:

a signal source for generating signals that propagate in wave-shaped fashion;

a sensor unit for emitting signals and receiving signals reflected by targets;

said sensor unit having an editing unit for editing a measured signal, and wherein the sensor unit emits and receives the signals so that a measured signal has time-stable frequencies from which a quantity to be measured or a plurality of quantities to be measured can be identified; and an evaluation unit for acquiring a previously defined plurality of measured values by sampling the measured signal at equidistant time intervals and storing these in a predetermined sequence, except for equivalent conversions, diagonalizing a data matrix in which the measured values are chronologically arranged as a double Hankel matrix according to a SVD method, determining an approximation of the diagonalized data matrix in that diagonal elements are set equal to zero beginning with a predetermined limit or a limit calculated from a distribution of the diagonal elements, and calculating frequencies from remaining diagonal elements.

5. The apparatus according to claim 4 wherein the sensor unit provides that the measured signal has time-stable frequencies by a means for frequency modulation of the signals generated by the signal source; and a mixer means for mixing a received signal with a current transmission signal.

6. The apparatus according to claim 5 wherein the sensor unit provides the measured signal as time-stable frequencies by a means for generating a reference signal by mixing the signal generated by the signal source with a signal that is delayed in time compared thereto.

* * * * *